United States Patent [19]

Rothen et al.

[11] 4,251,118

[45] Feb. 17, 1981

[54] SWITCHING CIRCUIT FOR THE DISABLING OF SPURIOUS SENSOR SIGNALS

[75] Inventors: Johann Rothen, Nordstemmen; Gunther Singbartl, Hanover, both of Fed. Rep. of Germany

[73] Assignee: WABCO Westinghouse GmbH, Hanover, Fed. Rep. of Germany

[21] Appl. No.: 934,241

[22] Filed: Aug. 16, 1978

[30] Foreign Application Priority Data

Aug. 31, 1977 [DE] Fed. Rep. of Germany ....... 2739173

[51] Int. Cl.³ .............................................. B60T 8/00
[52] U.S. Cl. ...................................... 303/91; 328/167
[58] Field of Search ................... 188/181; 303/20, 91, 303/93, 95–97, 103, 105–111; 307/233 R, 233 B, 261, 271; 328/138, 140, 141, 167; 364/426, 484, 572, 574, 724, 825

[56] References Cited

U.S. PATENT DOCUMENTS

| | | | |
|---|---|---|---|
| 3,640,586 | 2/1972 | Kohler | 303/91 |
| 3,930,727 | 1/1976 | Vergato | 328/167 X |
| 4,039,227 | 8/1977 | Sivulka | 303/91 X |
| 4,045,731 | 8/1977 | Tokunou et al. | 328/167 X |

*Primary Examiner*—Reinhard J. Eisenzopf
*Attorney, Agent, or Firm*—J. B. Sotak; R. W. McIntire, Jr.

[57] ABSTRACT

A controllable filter circuit for removing noise from the useful picked up speed sensing signal in an anti-skid vehicular braking system. The controllable filter circuit includes a pickup device, a frequency dependent low-pass filter, a sine-wave to rectangular-wave converter and threshold circuit, a frequency to voltage converter and a switching circuit for actuating the low-pass filter for dampening and blocking troublesome noise signals from the speed signals prior to feeding them to logic, amplifying and output devices.

8 Claims, 4 Drawing Figures

SWITCHING CIRCUIT FOR THE DISABLING OF SPURIOUS SENSOR SIGNALS

FIELD OF THE INVENTION

The invention relates to a switching filter circuit for rendering spurious signals ineffective in an anti-skid braking system and, more particularly, to a novel circuit for filtering noise pulses from the output of a speed sensing pickup device by switching a low-pass filter ON and OFF in accordance with the noise content of the input signal.

BACKGROUND OF THE INVENTION

In the braking operation of a moving vehicle, the mechanical system of the tooth wheel and sensor can go into oscillations with the result that noise and spurious signals are generated. These unwanted interfering signal frequencies can lead to faulty operation of the anti-skid vehicle brake system.

A previously preposed switching circuit is based upon the premise that the amplitudes of the spurious signals are as a rule considerably smaller than the amplitudes of the useful signal. In such a switching circuit, it is generally assumed that there is a certain amplitude ratio between the information bearing signals and the interfering spurious signals. Under such an assumption, it is common practice to suppress the interfering signals or spurious noise frequencies with the aid of threshold stages. It has been found, however, that in the case of axial generators and rotary oscillation devices, there frequently appears spurious noise signals with amplitudes on the order of magnitude of the amplitudes of the useful signals.

OBJECTS AND SUMMARY OF THE INVENTION

Thus, it is an object of this invention to provide a switching circuit which can suppress even spurious signals with amplitudes on the order of magnitude of the useful signals.

The above object is accomplished by a control circuit for rendering spurious sensor signals ineffective in an anti-skid vehicle braking system having at least one pickup device for sensing the rotating condition of at least one vehicle wheel. The pickup device is connected to an analog processing stage and to a logic circuit for obtaining brake pressure control signals characterized in that the pickup device is connectable to a controllable frequency dependent low-pass filter.

The invention makes use of the fact that the frequencies of the spurious or interfering sensor signals are normally higher than the frequencies of the useful sensor signals. The principle of the invention consists in controlling electrical filters in such a way that the spurious high frequency signals are attenuated while the useful low frequency signals are passed.

Another advantage of this invention resides in the fact that even those spurious noise signals with amplitudes equal to or greater than the amplitudes of the useful sensor signals are effectively removed. A further advantage lies in the fact that in the switching circuit, according to the invention, variations in the air-gap of the sensor system have no deleterious effect because there is little or no change in the signal amplitude.

An advantageous refinement of this invention is further characterized in that the low-pass filter can be switched ON and OFF as a function of a particular desired frequency. Thus, it is possible to switch the filter OFF below a certain desired frequency so that the filter attenuates the interfering frequencies and then to switch the filter ON again when the signals are above the desired frequency to allow for the free passage of the useful signals. Thus, the control circuit includes a further refinement which is characterized in that a frequency to voltage converter feeds a switching amplifier which switches the low-pass filter OFF when the frequency of the input signal to the frequency to voltage converter surpasses a certain value and which switches the low-pass filter ON when the frequency of the input signal to the frequency to voltage converter falls below the certain value.

Another advantageous refinement of the invention is characterized in that the upper frequency of the low-pass filter is varied as a function of a particular desired frequency of the sensor signals. Thus, it is possible to avoid switching the low-pass filter ON and OFF by shifting its upper frequency by means of controllable resistances, e.g., either by field-effect transistors or by means of programmable filters whose corner frequency can be varied by a control voltage. The useful frequency is used to control the upper frequency so that it is pushed to 50 Hz ahead of the useful frequency. Thus, a continuous adjustment is possible with the particular advantage that the filter is effective during the appearance of interfering frequencies which is independent of the useful signal frequency that is present at any given time.

Another advantageous refinement of this invention is characterized in that the controllable low-pass filters feed a sine-wave to rectangular-wave converter which includes a frequency controlled trigger-threshold circuit which can be varied by the frequency dependent output signal of the switching amplifier. Thus, it is possible to initially dampen the spurious signals in the low-pass filter and to subsequently block them in the subsequent trigger-threshold stage of the sine-wave to rectangular-wave converter. It has been found that above a certain useful frequency range, the signal is sufficiently large so that the signal threshold value is raised. This results in the advantage that the situation is avoided in which the increase in the signal threshold value over the entire frequency range in velocity sensing in an anti-skid vehicle brake system leads to an early signal decay, which would make regulation in the low-velocity range impossible. If one leaves the signal threshold value as is in the lower-velocity range and only increases the threshold value in the higher-velocity range where the useful signal is larger, one guarantees regulation in the entire frequency range and improves signal detection in an upper range in which possible disturbances allow one to expect greater effects on the stability of the vehicle.

An advantageous refinement of this invention is characterized in that the low-pass filter and the threshold circuit of the sine-wave to rectangular-wave converter each contains at least one voltage controlled resistance. Further, each of the resistances is preferably a field-effect transistor.

Another advantageous refinement of the invention is characterized in that a switch-ON time delay circuit is connectable in the control line of the low-pass filter and the trigger-threshold of the sine-wave to rectangular-wave converter. Such a measure prevents the interfering signal from turning the controllable low-pass filter OFF before the low-pass filter has swung in and is able to fulfill its dampening function.

DESCRIPTION OF THE DRAWINGS

A more complete understanding of the invention will be obtained from the following detailed description of a specific embodiment thereof when read in conjunction with the accompanying drawings, wherein.

DETAILED DESCRIPTION OF THE INVENTION

Figure 1:
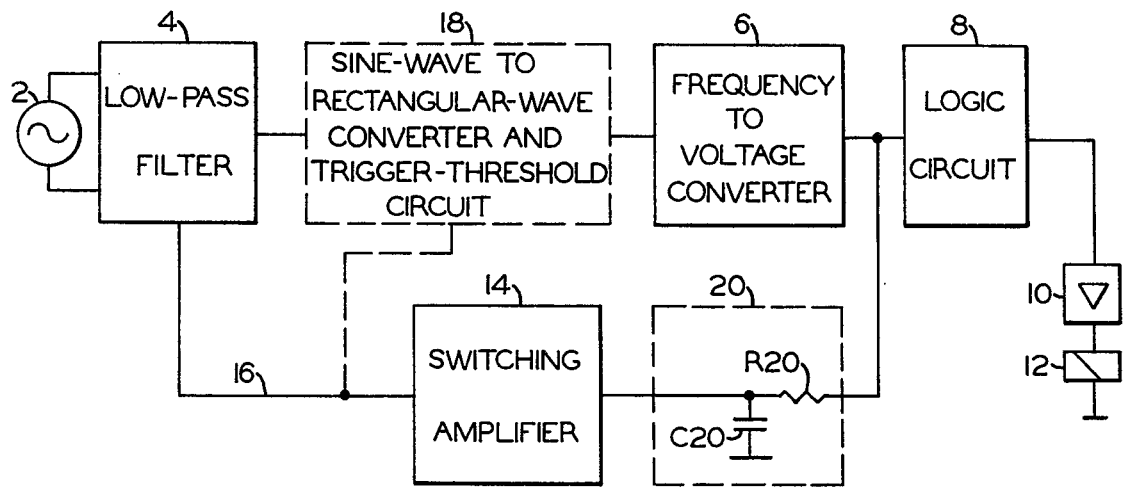
FIG. 1 is a schematic block diagram of a switching circuit with a switchable low-pass filter in accordance with the present invention, in which the possibility of the supplementary utilization of a sine-wave to rectangular-wave converter with a trigger-threshold circuit is indicated by the block drawn in broken lines.

Referring to the drawings and in particular to FIG. 1, there is shown a pickup signal generator, such as, an axial generator, which may be connected to a wheel of a vehicle by a suitable gear train or the like. Thus, the wheel driven axial generator takes the form of a speed sensor 2 which generates electrical signals having a frequency proportional to the velocity of the vehicle. The speed frequency signals from the sensor 2 are fed to a switchable low-pass filter 4. The output of filter 4 is conveyed to a frequency to voltage converter 6 via converter and trigger-threshold circuit 18 to be described later. The output signals of the frequency to voltage converter 6 are fed to a suitable logic circuit 8 that is conventionally employed in an anti-skid vehicle brake installation. The logic circuit 8 controls the electrical condition of a magnetic solenoid valve 12. As shown, the output of the logic circuit 8 is connected to a power amplifier 10. The output signals from the frequency to voltage converter 6 are also fed to a switching amplifier 14. The output of the amplifier 14 is connected to the low-pass filter 4 via a control line 16.

As shown in dashed lines, a sine-wave to rectangular-wave converter and a trigger-threshold circuit 18 is interposed between the low-pass filter 4 and the frequency to voltage converter 6. The trigger-threshold circuit is a variable device which will be described in greater detail hereinafter. The control circuit to the low-pass filter 4 and trigger-threshold circuit 18 also includes a low-pass filter 20, as shown in broken lines in FIG. 1.

The switching device, according to FIG. 1, operates in the following manner.

The function and operation of the trigger-threshold circuit 18 and the low-pass filter 20 will initially be omitted from the description of the switching circuit of FIG. 1.

Let us assume that signals from the speed sensing generator 2 are being delivered to the switchable low-pass filter 4. The speed signals are conveyed to the frequency to voltage converter 6 via circuit 18. The frequency of the speed signals is converted to a proportional output voltage by converter 6 and is fed to the input of logic circuit 8 and also to the input of switching amplifier 14 via filter 20. In practice, the switching amplifier 14 contains a threshold device that is preset to operate at a particular signal frequency. If the frequency of the output signal of the sensing generator 2 drops below this preselected frequency due to the appearance or development of noise or interference, the switching amplifier 14 switches into a first electrical state or condition. This condition causes the low-pass filter 4 to turn ON, whereby the interfering signal frequencies are attenuated. Conversely, when the frequency of the speed sensing signals exceeds the preselected frequency, the switching amplifier 14 switches into a second electrical state. Thus, this latter condition causes the low-pass filter to turn OFF so that further dampening or attenuation of the useful signals produced by the pickup sensor 2 is inhibited.

In addition, the conventional sine-wave to rectangular-wave converter can be provided with a trigger-type of threshold circuit. As mentioned above, the converter and threshold circuit is connected between the switchable low-pass filter 4 and the frequency to voltage converter 6. This trigger-threshold portion of circuit 18 is also controlled by the output signals of the switching amplifier 14. The increase of the trigger-threshold in the sine-wave to rectangular-wave converter causes the noise pulses or interference signals to drop below the trigger-threshold and accordingly are blocked.

The low-pass filter 20, which is schematically depicted in FIG. 1 as including a series resistor R20 and by-pass capacitor C20, serves as a time delay circuit. The filter circuit 20 is employed for the delayed variation for the trigger-threshold in the sine-wave to rectangular-wave converter and for limiting the frequency of the switchable low-pass filter 4.

Figure 2:
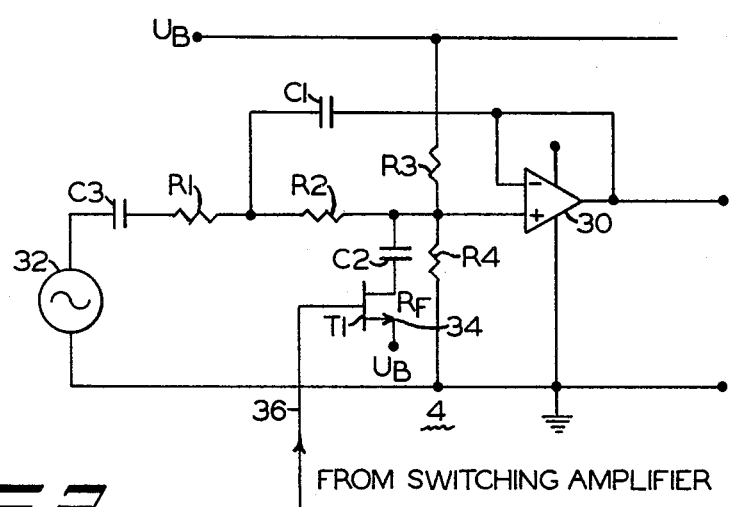
FIG. 2 is a basic circuit diagram of a switchable low-pass filter for utilization in the circuit according to FIG. 1.

In viewing FIG. 2, there is illustrated an example of a detailed schematic circuit diagram of the switchable low-pass filter 4 of FIG. 1. It will be appreciated that the switching operation is more or less self-evident from viewing the circuit details from the drawing. As shown, a voltage divider including a pair of resistances R3 and R4 is connected between the positive voltage $U_B$ and ground for establishing the operating point for a conventional integrated circuit operational amplifier 30. The junction point between resistors R2 and R4 is connected to the positive input terminal of amplifier 30. The frequency determining elements are resistance-capacitance elements R1, C1 and resistance-capacitance elements R2, C2. In practice, the values of resistors R3 and R4 are chosen to be much greater (>>) than the values of resistors R1 and R2. The signals produced by the speed sensor 32, which is identical to pickup axial generator 2, are fed to the low-pass filter via a coupling capacitor C3. The capacitor C3 serves to block the DC component of the a.c. speed sensing coupling signals. The capacitance value of capacitor C3 is chosen so large as to be without influence in the frequency range of the a.c. signal. The actual switching element which is turned ON and OFF is a P-channel field-effect transistor (FET) 34. The FET 34 is controlled by the switching amplifier 14 via line 36. The field-effect transistor 34 is switched ON or rendered conductive when the frequency of the signals eminating from sensor 32 is below a preselected frequency. The conduction of FET 34 causes the capacitor C2 of the low-pass filter to be connected to ground with respect to the AC component. Thus, the low-pass filter 4 of FIG. 2 is switched ON.

Conversely, when the frequency is above the preselected frequency, the field-effect transistor 34 is blocked or rendered nonconductive. Thus, the field-effect transistor 34 exhibits a very high resistance so that the low-pass filter 4 is effectively switched OFF.

Figure 3:
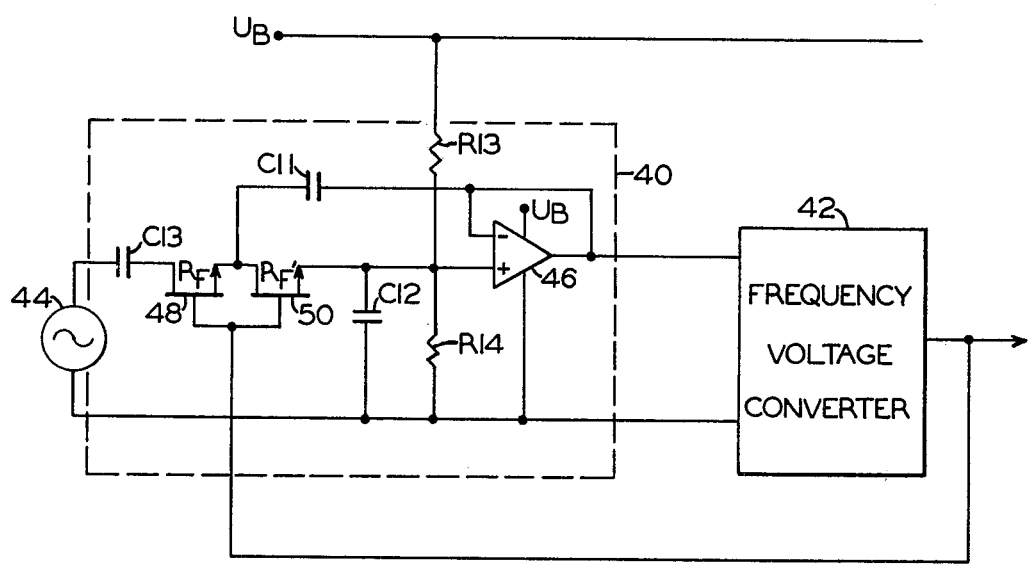
FIG. 3 illustrates a switching device according to the invention containing a low-pass filter with a variable limit frequency.

Turning now to FIG. 3, there is shown another embodiment of a controllable switching circuit which may be combined with a low-pass filter. This switching arrangement functions as a frequency limiting circuit which is controlled in proportion to the frequency-determined output voltage fed back by the frequency to voltage converter 42. In operation, the variable switching filter circuit attenuates high frequency signals which contain noise and interference but permit the free passage of the lower frequency useful signals that are produced by speed sensor 44. In reviewing the circuit of FIG. 3, it will be noted that the low-pass filter 40 includes a commercially available integrated circuit operational amplifier 46, a pair of N-channel field-effect transistors (FET) 48 and 50 and a plurality of resistors and capacitors R13, R14 and C11, C12, C13, respectively. The resistances R13 and R14 operate as a voltage divider and serve to establish the operating point of an operational amplifier 46. In practice, the values of resistances R13, R14 are much greater (>>) than the values of resistances $R_F$, $R_{F'}$, where $R_F$, $R_{F'}$ represent the resistances of the field-effect transistors (FET) 48 and 50, respectively. The FETS 48 and 50 are employed as variable resistors. The frequency-determining elements are resistance-capacitance $R_F$-C11 and resistance-capacitance $R_{F'}$-C12. The coupling capacitor C13 serves to block the DC component but does not materially limit the useful AC signals.

The change or variation of the effective resistances $R_F$ and $R_{F'}$ of the field-effect transistors 48 and 50 is accomplished by controlling the potential on their gate electrodes. As shown in FIG. 3, this is brought about by the output voltage of the frequency to voltage converter 42 in common to the FETS 48 and 50. Thus, by increasing the voltages on the gate electrodes, the resistances of the field-effect transistors 48 and 50 are reduced and the limit frequency of the low-pass filter 40 is thus raised. In this manner, it is possible, for example, to shift the limit frequency by a certain amount ahead of the frequency of the useful sensor signals. Thus, a continuous adjustment to the circumstances of the individual case is possible, and the low-pass filter remains switched ON practically always without attenuating the useful signals generated by the speed sensor 44.

Figure 4:
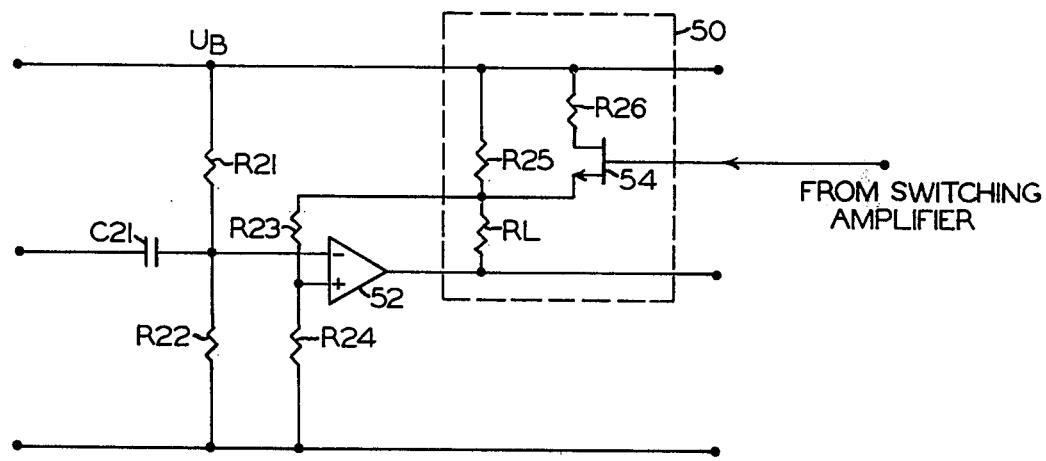
FIG. 4 illustrates a basic circuit diagram of a sine-wave to rectangular-wave converter and a variable trigger-threshold for combination with the circuits according to FIGS. 1 and 3.

Referring now to FIG. 4, there is illustrated a basic circuit diagram of a sine-wave to rectangular-wave converter and a variable trigger-threshold 18. The circuit of FIG. 4 provides a means for the variation of the trigger-threshold. The circuit utilizes a switching circuit 50 that is controlled by a suitable switching amplifier (not shown). The switching circuit 50, in turn, is connected to the positive terminal of an integrated circuit operational amplifier via series resistors R23 and R24. The operating point of the integrated circuit operational amplifier 52 is regulated by means of the voltage dividing resistances R21 and R22. It will be seen that the negative terminal of operational amplifier 52 is connected to the junction between resistors R21 and R22 which, in turn, is supplied speed sensing signals via capacitor C21. The blocking capacitor C21 serves to block the DC component. The value of capacitance C21 is selected to be relatively large so that its effect is negligible in the desired frequency range employed.

The switching circuit 50 contains a voltage responsive variable resistance in the form of an N-channel field-effect transistor (FET) 54. The trigger-threshold may be varied by means of a pair of parallel resistances R25 and R26. A load resistor RL is between resistor R25 and the output of the operational amplifier 52. It will be understood that below a certain signal frequency the switching amplifier supplies a certain switching voltage. Under this condition, the field-effect transistor 54 is switched into the conducting state. Thus, a small trigger-threshold is switched ON so that the resistances R25 and R26 are effective as parallel resistances. It will be appreciated that when the speed signal is above the preselected frequency, the field-effect transistor 54 is switched into the nonconducting state. Thus, the field-effect transistor exhibits a very high resistance, in which case, only the resistance $R_5$ is effective so that a correspondingly higher trigger-threshold is switched ON.

Having now described the invention, what we claim as new and desire to secure by Letters Patent, is:

1. A control circuit for rendering spurious sensor signals ineffective to an anti-skid vehicle braking system having at least one pickup device for sensing the rotating conditions of at least one vehicle wheel, the pickup device is connected to an analog processing stage and to a logic circuit for obtaining brake pressure control signals, characterized in that said analog processing stage includes a controllable frequency dependent low-pass filter, said low-pass filter is connectable to a sine-wave to rectangular-wave converter which includes a frequency control trigger-threshold circuit, said sine-wave to rectangular-wave converter is connectable to a frequency to voltage converter, said frequency to voltage converter is connectable to a switching amplifier, said switching amplifier is connectable to said low-pass filter and said trigger-threshold circuit.

2. A control circuit according to claim 1, characterized in that said low-pass filter can be switched ON and OFF as a function of a particular desired frequency.

3. A control circuit according to claim 1, characterized in that said low-pass filter has an upper frequency which is varied as a function of the desired frequency of sensor signals.

4. A control circuit according to claim 1, characterized in that said frequency to voltage converter produces an output signal which is dependent on the desired frequency of an input signal for controlling said low-pass filter.

5. A control circuit according to claim 1, characterized in that said switching amplifier switches the low-pass filter ON when the frequency of an input signal to said frequency to voltage converter surpasses a certain value and which switches the low-pass filter OFF when the frequency of the input signal to said frequency to voltage converter falls below the certain value.

6. A control circuit according to claim 1, characterized in that said frequency control trigger-threshold circuit can be varied in accordance with a frequency dependent output signal of the switching amplifier.

7. A control circuit according to claim 1, characterized in that said low-pass filter and said trigger-threshold circuit each contains at least one voltage controlled resistance.

8. A control circuit according to claim 1, characterized in that a switch-ON delay is connectable to said low-pass filter and said trigger-threshold circuit of the sine-wave to rectangular-wave converter.

* * * * *